United States Patent
Lim et al.

(10) Patent No.: US 10,111,158 B2
(45) Date of Patent: Oct. 23, 2018

(54) NETWORK SYSTEM, ACCESS POINT, AND CONNECTION METHOD THEREOF

(71) Applicant: SAMSUNG ELECTRONICS CO., LTD., Suwon-si (KR)

(72) Inventors: Kyeong-chae Lim, Seoul (KR); Hyun-koo Kang, Yongin-si (KR); Jin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 153 days.

(21) Appl. No.: 14/722,871

(22) Filed: May 27, 2015

(65) Prior Publication Data
US 2015/0351006 A1 Dec. 3, 2015

(30) Foreign Application Priority Data
May 27, 2014 (KR) ........................ 10-2014-0063993

(51) Int. Cl.
| | |
|---|---|
| *H04W 4/00* | (2018.01) |
| *H04W 48/14* | (2009.01) |
| *H04W 12/06* | (2009.01) |
| *H04L 29/12* | (2006.01) |
| *H04L 29/06* | (2006.01) |
| *H04W 84/12* | (2009.01) |
| *H04L 29/08* | (2006.01) |

(52) U.S. Cl.
CPC ......... *H04W 48/14* (2013.01); *H04L 61/1511* (2013.01); *H04L 61/303* (2013.01); *H04W 12/06* (2013.01); *H04L 63/083* (2013.01); *H04L 67/02* (2013.01); *H04W 84/12* (2013.01)

(58) Field of Classification Search
CPC ..... H04W 12/04; H04W 12/06; H04W 12/08; H04W 12/12; H04W 88/08; H04W 88/12; H04W 88/18
See application file for complete search history.

(56) References Cited

U.S. PATENT DOCUMENTS

2006/0190991 A1* 8/2006 Iyer ........................ H04L 63/083 726/3
2010/0023611 A1* 1/2010 Yang ................. H04L 29/12066 709/223

* cited by examiner

*Primary Examiner* — Alvin Zhu
(74) *Attorney, Agent, or Firm* — Sughrue Mion, PLLC

(57) ABSTRACT

A network system, an access point, and a connection method thereof are provided. The access point includes a communicator configured to communicate with a wireless devices, and a controller configured to control the communicator to acquire authentication information based on a Uniform Resource Locator (URL) that is received from the wireless device, and to perform connection with an electronic device based on the acquired authentication information.

15 Claims, 18 Drawing Sheets

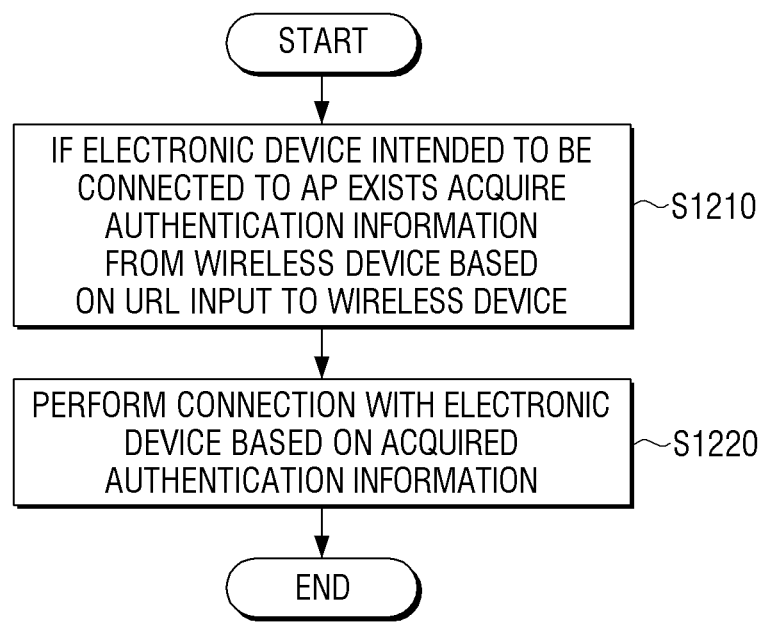

NETWORK SYSTEM, ACCESS POINT, AND CONNECTION METHOD THEREOF

PRIORITY

This application claims priority from Korean Patent Application No. 10-2014-0063993, filed on May 27, 2014 in the Korean Intellectual Property Office, the disclosure of which is incorporated herein by reference.

BACKGROUND

1. Field

Systems, apparatuses, and methods consistent with exemplary embodiments relate to a network system, an access point, and a connection method thereof, and more particularly to a network system, an access point, and a connection method thereof, which can provide a WiFi type connection.

2. Description of the Related Art

Recently, with the rapid improvement of wireless network technology, it becomes possible for many wireless devices to connect to the Internet through an access point (AP).

In this case, wireless devices can be connected to an access point using various Wireless Fidelity (WiFi) technologies, such as a password input method and a WiFi Protection Setup (WPS) method.

In the case of the password input method, connection between a wireless device and an access point is performed in a manner that the access point broadcasts its own identification information (e.g., Service Set Identifier (SSID)), and the wireless device identifies the access point that is positioned in the neighborhood through the identification information, and transmits a password that is predetermined with respect to the access point to the access point.

In this case, however, it is necessary for a user to know in advance the SSID of the access point to be connected and the password for the connection, and this may cause inconvenience to the user.

On the other hand, the WPS method may be classified into a WPS Push Button Configuration (PBC) method that is triggered using buttons, and a WPS Personal Identification Number (PIN) method that is triggered through a PIN.

First, the WPS PBC method is a method that performs WPS between an access point and a wireless device through pressing of physical buttons that are provided in both the access point and the wireless device.

In this case, it is required to press a button that is provided in the access point and then to press a button that is provided in the wireless device. However, most devices may not be provided with any button, and even if such a button is provided in the wireless device, it may be affected by intentional interference, such as pressing of a button for another device rather than the device intended to be connected.

On the other hand, the WPS PIN method is a method that performs WPS through inputting of the PIN of an access point to a wireless device, or inputting of the PIN of a wireless device to an access point, and then performing authentication of the input PIN.

In this case, it is required to acquire and input the PIN of the wireless device to the access point through connection to a set web page of the access point, and this may cause inconvenience to the user.

Accordingly, there is a need for schemes to perform connection between the access point and the wireless device more conveniently.

SUMMARY

Exemplary embodiments to provide a network system, an access point, and a connection method thereof, which can acquire and provide a PIN of an electronic device to an access point more conveniently in the case of performing WPS between the access point and the electronic device using the PIN.

According to an aspect of an exemplary embodiment, there is provided an access point, the access point including a communicator configured to communicate with a wireless device; and a controller configured to control the communicator to acquire authentication information based on a Uniform Resource Locator (URL) that is received from the wireless device and to perform connection with an electronic device based on the acquired authentication information.

The authentication information may be a Personal Identification Number (PIN) for performing WiFi Protected Setup (WPS) between the access point and the electronic device.

If the URL is a Domain Name System (DNS) query, the controller may be configured to parse the PIN from the received DNS query.

The communicator may receive a PIN from the electronic device and the controller may be configured to perform the connection between the access point and the electronic device by performing the WPS using the PIN that is received from the electronic device and the PIN that is detected from the received DNS query.

If the URL is a DNS query and the received DNS query satisfies a condition, the controller may be configured to control the communicator to send to the wireless device a User Interface (UI) screen for receiving an input of the PIN.

If the received DNS query includes a certain domain name, the controller may be configured determine that the received DNS query satisfies the condition.

The communicator may receive the PIN input to the UI screen, from the wireless device, and the controller may be configured to receive a PIN from the electronic device and perform the connection between the access point and the electronic device by performing the WPS using the PIN that is received from the electronic device and the PIN that is received from the wireless device through the UI screen.

According to an aspect of another exemplary embodiment, there is provided a network system including an electronic device and an access point, wherein the electronic device is configured to broadcast a connection request signal that includes first authentication information for connection with the access point; and the access point is configured to receive the connection request signal, and to perform connection with the electronic device based on the first authentication information and second authentication information which is received from a wireless device that is connected to the access point.

Each of the first authentication information and the second authentication information may be a PIN for performing WPS between the electronic device and the access point.

The electronic device may be configured to display the authentication information.

The access point may be configured to acquire the second authentication information based on a Uniform Resource Locator (URL) that is received from the wireless device.

According to an aspect of another exemplary embodiment, there is provided a connection method of an access point that is connected to a wireless device, the connection method including acquiring authentication information based on a Uniform Resource Locator (URL) that is received from the wireless device if an electronic device exists; and performing connection with the electronic device based on the acquired authentication information.

The authentication information may comprise a Personal Identification Number (PIN) for performing WiFi Protected Setup (WPS) between the access point and the electronic device.

The URL may be a Domain Name System (DNS) query, and the acquiring the authentication information may include detecting the PIN from the received DNS query.

The connection method may further include receiving a PIN from the electronic device, wherein the connection is performed between the access point and the electronic device by performing the WPS using the PIN that is received from the electronic device and the PIN that is detected from the received DNS query.

The URL may be a DNS query, and the acquiring may include if the received DNS query satisfies a condition, sending a User Interface (UI) screen to the wireless device, the UI screen including a window for receiving an input of the PIN.

If the received DNS query includes a certain domain name, the received DNS query may satisfy the condition.

The connection method may further comprise receiving the PIN input to the UI screen, from the wireless device, and receiving a PIN from the electronic device, wherein the connection is performed between the access point and the electronic device by through performing the WPS using the PIN that is received from the electronic device and the PIN that is received from the wireless device through the UI screen.

According to an aspect of another exemplary embodiment, there is provided a connection method of an access point, the method including receiving from an electronic device a connection request that includes a PIN and a request to connect to the access point using WiFi Protected Setup (WPS); receiving, from a wireless device which is already connected to the access point at the time the connection request is received, a Uniform Resource Locator (URL); connecting with the electronic device using WPS based on the PIN, and authentication information based on the received URL.

The URL may be a Domain Name System (DNS) query, and the method may further comprise parsing the DNS query to extract a PIN as the authentication information.

The URL may be a Domain Name System (DNS) query, and the method may further include determining whether the DNS query includes a certain domain name, and if the DNS query includes the certain domain name sending to the wireless device a User Interface (UI) screen that includes an input window for receiving an input of a PIN from the user, and in response to sending the UI screen, receiving the PIN as the authentication information.

BRIEF DESCRIPTION OF THE DRAWINGS

The above and other aspects will be more apparent from the following detailed description of exemplary embodiments taken in conjunction with the accompanying drawings, in which:

FIG. 12 is a flowchart explaining a connection method of an access point according to an exemplary embodiment.

DETAILED DESCRIPTION OF EXEMPLARY EMBODIMENTS

Hereinafter, exemplary embodiments will be described in detail with reference to the accompanying drawings.

Figure 1:
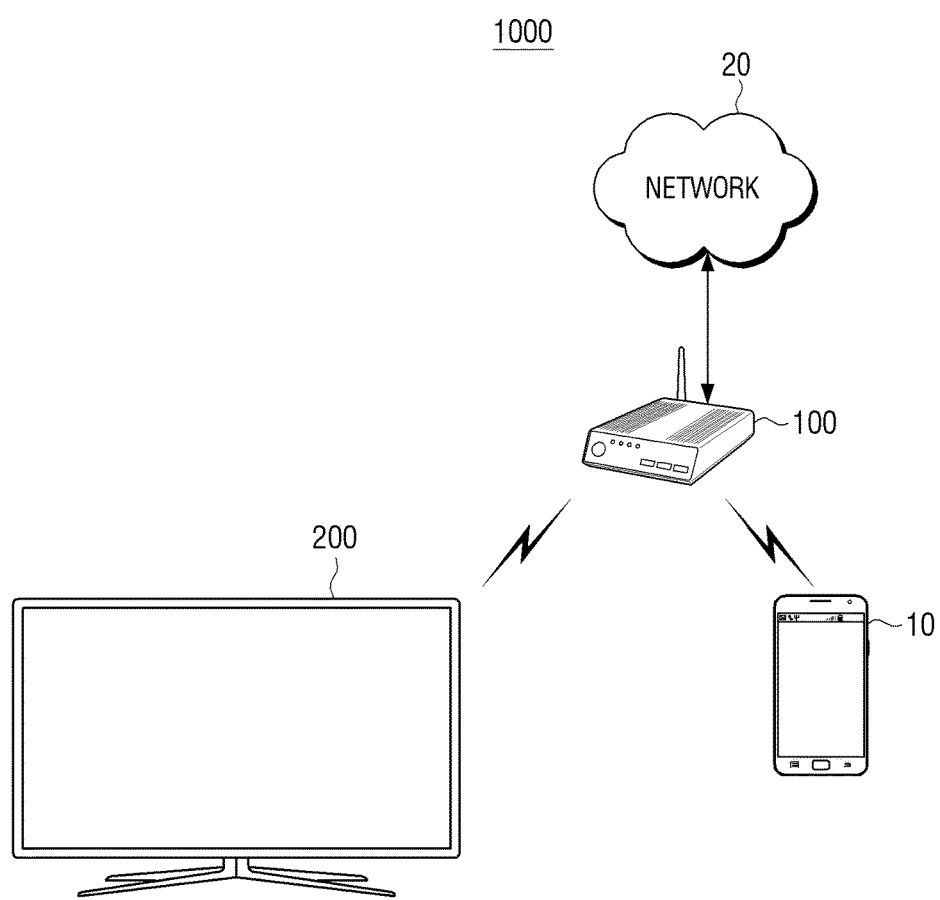
FIG. 1 is a diagram illustrating an example of a network system according to an exemplary embodiment.

FIG. 1 is a diagram illustrating an example of a network system according to an exemplary embodiment. Referring to FIG. 1, a network system 1000 may include a wireless device 10, an access point (AP) 100, and an electronic device 200, which may constitute a network in a WiFi method.

The access point 100 may be wirelessly connected to the wireless device 10 and the electronic device 200 to make the wireless device 10 and the electronic device 200 connected to a network 200. Here, the network 20 may be the Internet.

The access point 100 may wirelessly communicate with the wireless device 10 and the electronic device 200 to transfer data that is provided from the network 20 to the wireless device 10 and the electronic device 200, and to transfer data that is received from the wireless device 10 and the electronic device 200 to the network 20. In some cases, other devices may be connected to the access point 100 through a router (not illustrated) in order to transfer data corresponding destination of the network 20.

On the other hand, the access point 100 and the electronic device 200 may be connected to each other through performing of WiFi Protected Setup (WPS) through a Personal Identification Number (PIN).

During performing of the WPS through the PIN, in the related art, it is required that a user confirms the PIN of the electronic device 200, connects to a set web page of the access point 100 through a PC or the like, searches for a menu on the set web page, and inputs the PIN of the electronic device 200 to the access point 100.

However, by contrast according to exemplary embodiment, the access point 100 may acquire the PIN from the wireless device 10 connected thereto.

Specifically, the access point 100 may acquire the PIN that is used when the WPS is performed between the access point 100 and the electronic device 200 based on an Uniform Resource Locator (URL) that is input to the wireless device 10.

For example, if a Domain Name System (DNS) query which corresponds to the URL that is input to the wireless device 10 is received from the wireless device 10, the access point 100 may detect the PIN from the received DNS query.

As another example, in the case where the DNS query which corresponds to the URL that is input to the wireless device 10 is received from the wireless device 10, and the received DNS query satisfies a condition, the access point 100 may display a User Interface (UI) screen for receiving an input of the PIN on the wireless device 10 to receive the PIN from the wireless device 10. The condition may be predetermined.

As described above, according to exemplary embodiment, since the access point 100 and the electronic device 200 can acquire the PIN that is used to perform the WPS from the wireless device 10, it is not required that a user searches for a menu on a set web page of the access point 100 to input the PIN, and thus the inconvenience of the user can be reduced.

Hereinafter, referring to FIGS. 2 to 5, a method for performing connection between the access point 100 and the electronic device 200 will be described in detail. In some exemplary embodiments, a process of performing a connection between the access point 100 and the electronic device 200 as shown in FIGS. 2 to 5 may be based on IEEE 802.11.

Figure 2:
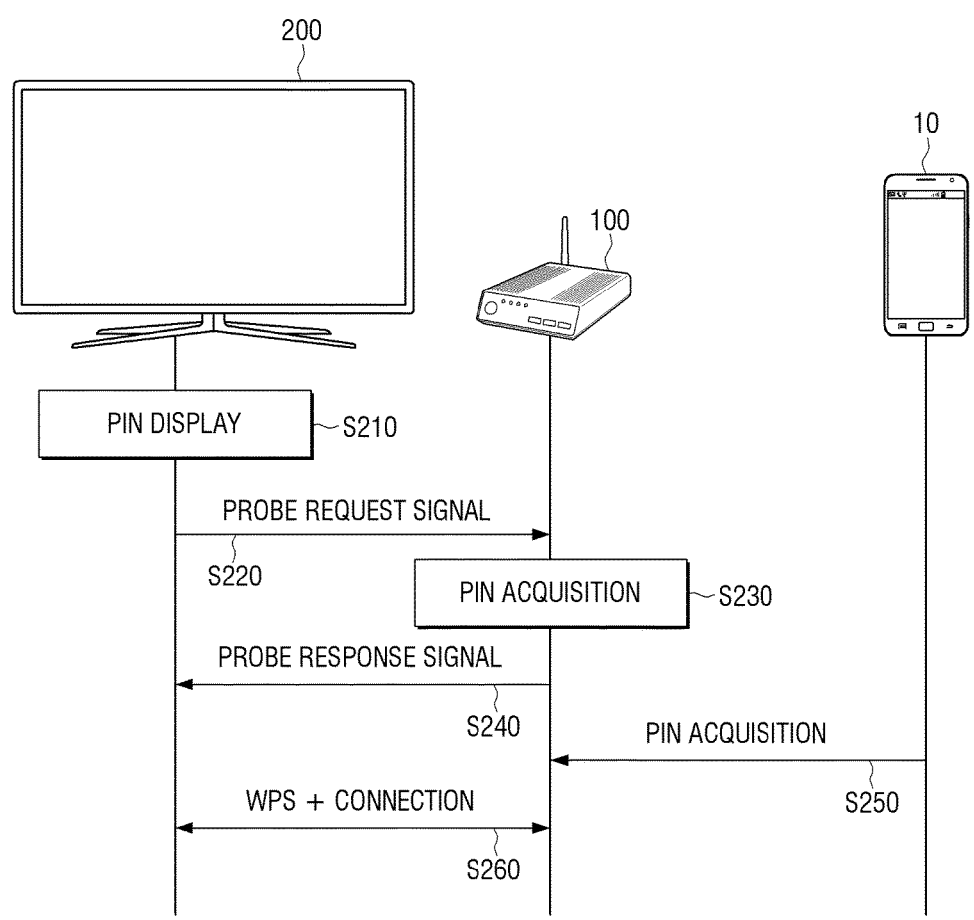
FIGS. 2 to 5 are sequence diagrams illustrating a process of performing a connection between an access point and an electronic device according to an exemplary embodiment.

FIG. 2 is a sequence diagram explaining an example of a connection method between an access point and an electronic device according to an exemplary embodiment.

The electronic device 200 generates and displays a PIN (S210). Here, the PIN may be authentication information for connection between the access point 100 and the electronic device 200.

Thereafter, the electronic device 200 broadcasts a probe request signal to inform a neighborhood of the presence of the electronic device 200 (S220). In this case, the probe request signal may include information about the PIN. The neighborhood includes devices that are within a wireless transmission range of the electronic device 200.

Although it is described that the electronic device 200 first displays the PIN and then broadcasts the probe request signal, this is merely exemplary. That is, the electronic device 200 may broadcast the probe request signal first and then may display the PIN.

If the probe request signal that is broadcasted by the electronic device 200 is received, the access point 100 may recognize that the electronic device 200 exists in the neighborhood of the access point 100, and may acquire the PIN from the probe request signal (S230).

Further, the access point 100 transmits a probe response signal to the electronic device 200 (S240). In this case, the probe response signal may include an Service Set Identifier (SSID), a media access control (MAC) address, and network setting information of the access point 100.

Although it is described that the access point 100 acquires the PIN from the probe request signal and then transmits the probe response signal, this is merely exemplary. That is, the access point 100 may first transmit the probe response signal in response to receiving the probe request signal and thereafter may acquire the PIN from the probe request signal.

Thereafter, the access point 100 acquires the PIN from the wireless device 10 that is wirelessly connected to the access point 100 (S250).

For this, the access point 100 and the wireless device 10 may be connected to each other through various known methods. For example, the access point 100 and the wireless device 10 may be connected to each other through an SSID and a password, or may be connected to each other through performing of the WPS by a physical button or the PIN.

The PIN that the access point 100 acquires from the wireless device 10 is authentication information for connection between the access point 100 and the electronic device 200. Accordingly, if the PIN that the electronic device 200 generates and transmits to the access point 100 matches the PIN that is acquired from the wireless device 10, the access point 100 may perform the WPS with the electronic device 200 using the PIN. A method in which the access point 100 acquires the PIN from the wireless device 10 will be described later with reference to FIGS. 3 and 4.

Thereafter, the access point 100 determines whether the PIN that is received from the electronic device 200 matches the PIN that is acquired from the wireless device 10, and if the PINs match each other, the access point 100 performs the WPS with the electronic device 200. Accordingly, the access point 100 and the electronic device 200 may be connected to each other (S260).

Hereinafter, referring to FIGS. 3 and 4, the method in which the access point 100 acquires the PIN from the wireless device 10 will be described.

Figure 3:
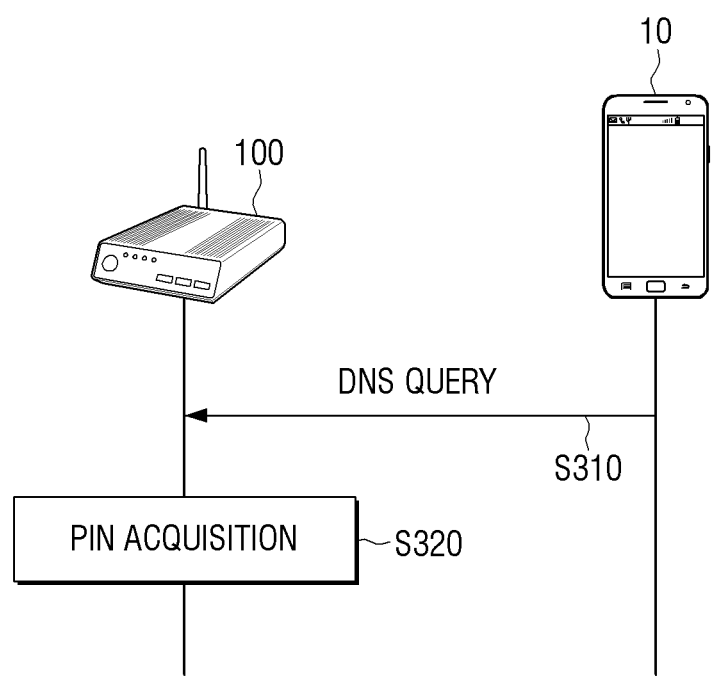

FIG. 3 is a sequence diagram explaining an example of a method in which the access point acquires the PIN from the wireless device according to an exemplary embodiment.

The wireless device 10 is connected to the access point 100, and transmits a DNS query that corresponds to the URL that is input on an address input window of a web page, to the access point 100 (S310).

Accordingly, if the DNS query is received from the wireless device 10, the access point 100 may acquire the PIN from the received DNS query (S320). Specifically, the access point 100 may detect a numeral that is included in the received DNS query as the PIN.

Figure 4:
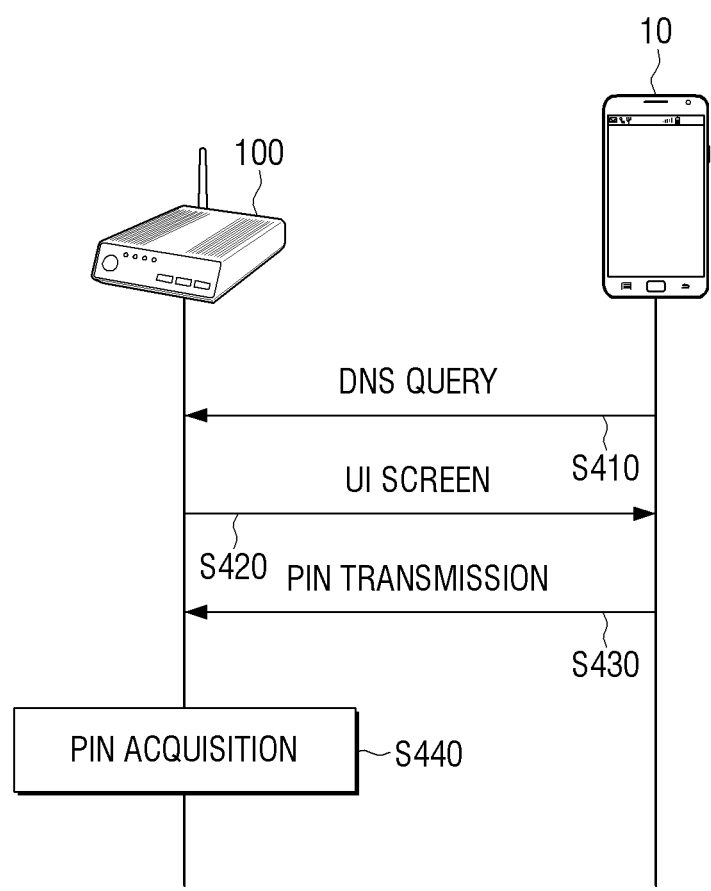

FIG. 4 is a sequence diagram explaining another example of a method in which the access point acquires the PIN from the wireless device according to an exemplary embodiment.

The wireless device 10 is connected to the access point 100, and transmits a DNS query that corresponds to the URL that is input on an address input window of a web page, to the access point 100 (S410).

If the DNS query is received from the wireless device 10, and if the received DNS query satisfies a condition, the access point 100 transmits a UI screen for receiving an input of the PIN on the wireless device 10, to the wireless device (S420). The condition may be predetermined.

Specifically, if a predetermined domain name is included in the received DNS query, the access point 100 may determine that the corresponding DNS query satisfies the condition and may transmit the UI screen for receiving an input of PIN on the wireless device 10, to the wireless device 10.

The wireless device 10 may display the UI screen in order for a user to enter a PIN using the wireless device.

Thereafter, the wireless device 10 transmits the PIN that is input on the UI screen to the access point 100 (S430). Accordingly, the access point 100 may acquire the PIN (S440).

Figure 5:
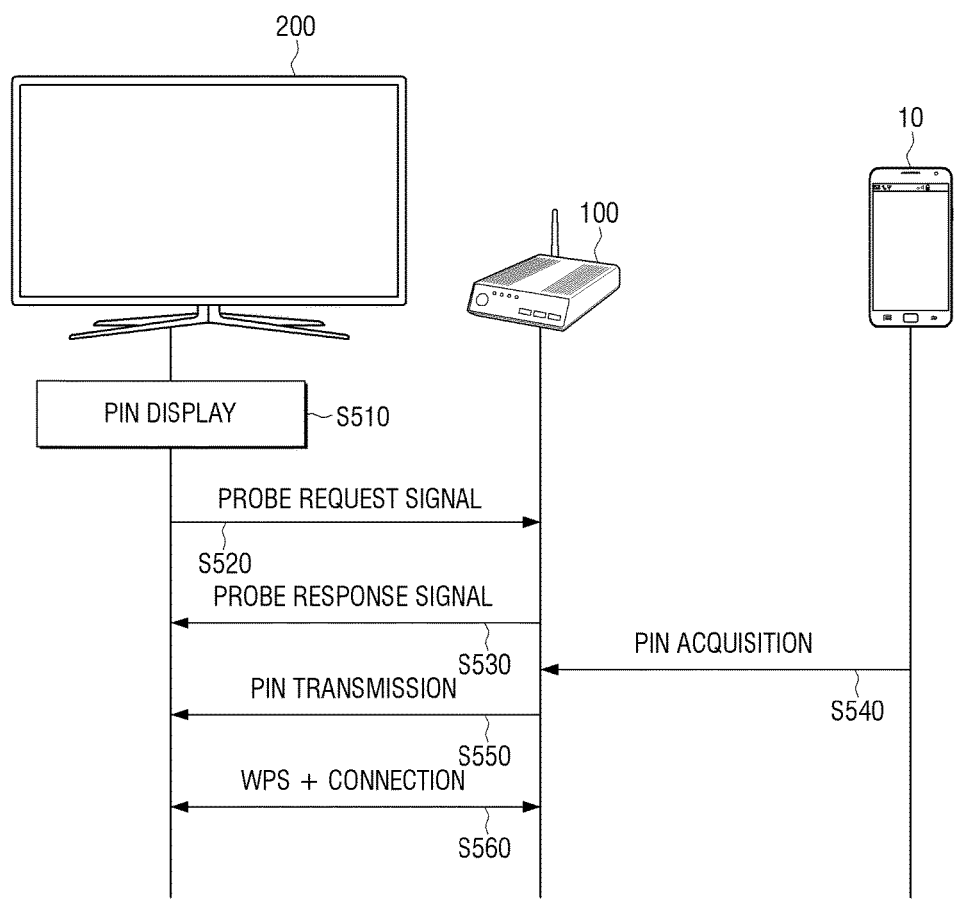

FIG. 5 is a sequence diagram explaining another example of a method for performing a connection between an access point and an electronic device according to an exemplary embodiment. The method as illustrated in FIG. 5 will be described around different points from the method as described above with reference to FIG. 2.

The electronic device 200 generates and displays a PIN (S510). Here, the PIN may be authentication information for connection between the access point 100 and the electronic device 200.

Thereafter, the electronic device 200 broadcasts a probe request signal to inform a neighborhood of the electronic device 200 of a presence of the electronic device 200 (S520). Unlike that as described above with reference to FIG. 2, the probe request signal does not include information about the PIN.

Although it is described that the electronic device 200 first displays the PIN and then broadcasts the probe request signal, this is merely exemplary. That is, the electronic device 200 may broadcast the probe request signal and then may display the PIN.

If the probe request signal that is broadcasted by the electronic device 200 is received, the access point 100 recognizes that the electronic device 200 exists in the neighborhood of the access point 100, and transmits a probe response signal to the electronic device 200 (S530).

Thereafter, the access point 100 acquires the PIN from the wireless device 10 connected to the access point 100 (S540). The method in which the access point 100 acquires the PIN from the wireless device 10 may be the same as the method as described above with reference to FIGS. 3 and 4.

Then, the access point 100 transmits the PIN that is acquired from the wireless device 10 to the electronic device 200 (S550).

Here, the PIN that the access point 100 transmits to the electronic device 200, i.e., the PIN that is acquired from the wireless device 10, is authentication information for connection between the access point 100 and the electronic device 200. Accordingly, if the PIN that is generated by the electronic device 200 matches the PIN that is received from the access point 100, the electronic device 200 may perform WPS with the access point 100 using the PIN.

As a result, the electronic device 200 determines whether the PIN that is generated by the electronic device 200 matches the PIN that is received from the access point 100, and if they match each other, the electronic device 200 performs the WPS with the access point 100. Accordingly, the access point 100 and the electronic device 200 may be connected to each other (S560).

Although not illustrated in FIGS. 2 and 5, the access point 100 and the electronic device 200 may additionally perform a process of transmitting and receiving an authentication request/authentication response and an association request/association response as defined in IEEE 802.11.

Hereinafter, referring to FIGS. 6A, 6B, 7A, and 7B, the operation of respective constituent elements of the access point 100 and the electronic device 200 to perform the connection in the methods as described above with reference to FIGS. 2 and 5 will be described.

Figure 6A:
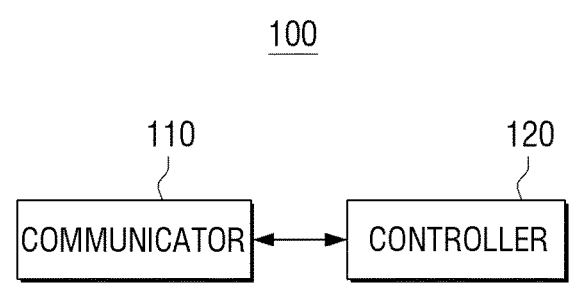
FIGS. 6A and 6B are block diagrams explaining an example of a configuration of an access point according to an exemplary embodiment.
Figure 6B:
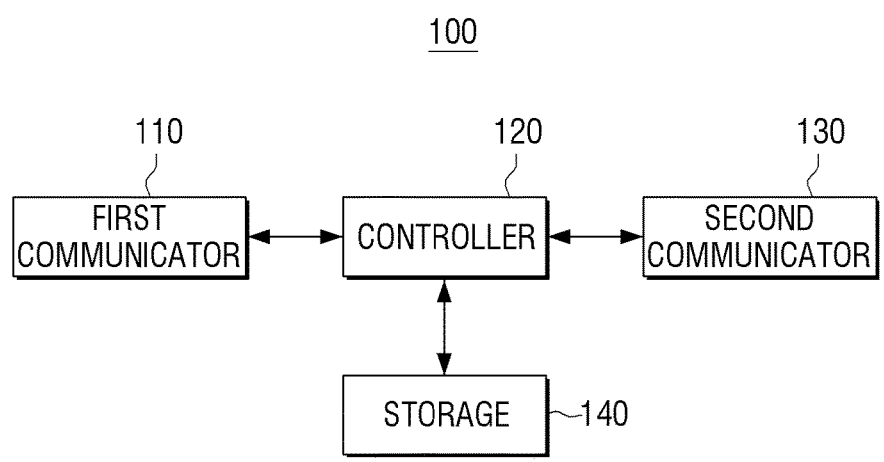
Figure 7A:
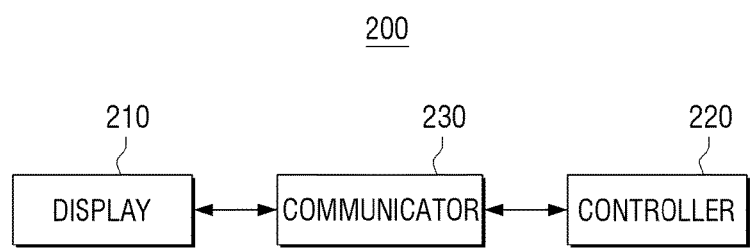
FIGS. 7A and 7B are block diagrams explaining an example of a configuration of an electronic device according to another exemplary embodiment.
Figure 7B:
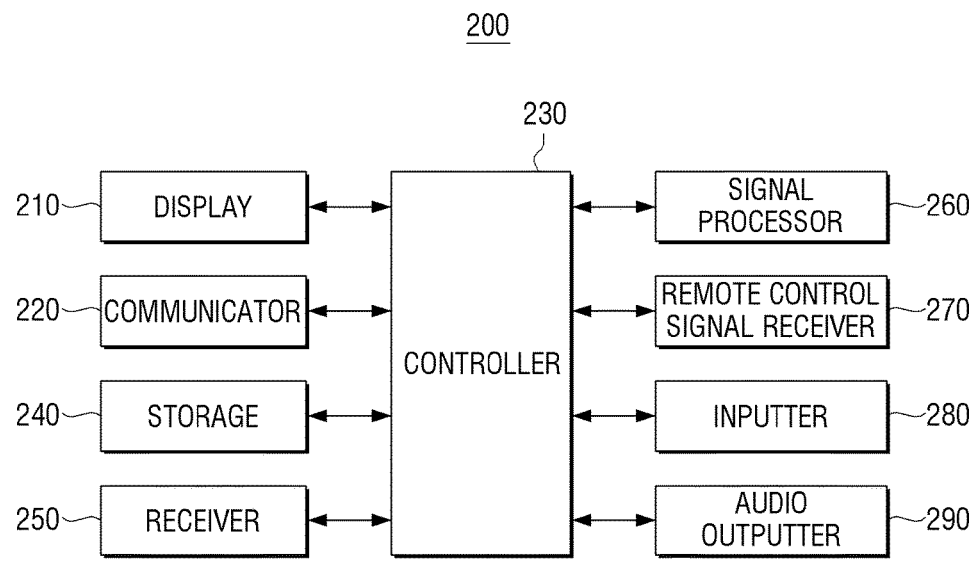

FIGS. 6A and 6B are block diagrams explaining configurations of an access point according to an exemplary embodiment, and FIGS. 7A and 7B are block diagrams explaining configurations of an electronic device according to exemplary embodiments.

First, in order to perform a connection in the method as described above with reference to FIG. 2, the operation of respective constituent elements of the access point 100 and the electronic device 200 will be described.

FIG. 6A is a block diagram explaining the configuration of the access point 100. As shown in FIG. 6A, the access point 100 includes a communicator 110 and a controller 120.

The communicator 110 may perform communication with an external device. Specifically, the communicator 110 may be provided with a communication module (not illustrated) according to a WiFi method, and may perform wireless communication with the wireless device 10 and the electronic device 200.

The controller 120 controls the entire operation of the access point 100. For this, the controller 120 may include a microcomputer (or Central Processing Unit (CPU), a Random Access Memory (RAM) and a Read Only Memory (ROM) for the operation of the access point 100. In this case, these modules may be implemented in the form of a System on Chip (SoC). The controller 120 may alternatively include a plurality of microprocessors, a plurality of CPUs, or a plurality of microcomputers.

First, if a connection request signal that is broadcasted by the electronic device 200 is received through the communicator 110, the controller 120 may recognize that the electronic device 200 exists in the neighborhood of the access point 100. That is, the controller 100 may search for the electronic device 200 based on the connection request signal.

Here, the connection request signal may be a probe request signal, and may include information about a manufacturer and a model name to the electronic device 200, and a PIN. The PIN is authentication information for the connection between the access point 100 and the electronic device 200, and may be generated by the electronic device 200.

Accordingly, the controller 120 may determine the manufacturer and the model name of the electronic device 200 based on the connection request signal, and may acquire the PIN from the connection request signal to store the acquired PIN in the access point 100.

In this case, the PIN may be encrypted in an encryption method between the access point 100 and the electronic device 200 and may be inserted into a field of a packet that constitutes the connection request signal. The encryption method and the field may be predefined.

Accordingly, if the manufacturer of the electronic device 200 is determined as a specific manufacturer, the controller 120 may acquire the encrypted PIN from the field of the packet that constitutes the connection request signal, and may decrypt the PIN in a decryption method corresponding to the encryption method with the corresponding manufacturer to store the decrypted PIN.

If the connection request signal is received, the controller 120 may control the communicator 110 to transmit a connection response signal to the electronic device 200. Here, the connection response signal may be a probe response signal, and may include an SSID, an MAC address, and network setting information of the access point 100.

If the electronic device 200 intended to be connected to the access point 100 exists, the controller 120 may control the communicator 110 to acquire the authentication information based on the URL that is input to the wireless device 10 and to perform connection with the electronic device 200 based on the acquired authentication information.

Here, the authentication information may be the PIN for performing the WPS between the access point 100 and the electronic device 200.

In this case, the PIN that is acquired from the connection request signal of the electronic device 200 is the PIN of the electronic device 200 that is generated by the electronic device, and thus if the PIN that is acquired based on the URL input to the wireless device 10 matches the PIN that is acquired from the connection request signal of the electronic device 200, the controller 120 may perform the WPS to perform the connection between the access point 100 and the electronic device 200.

Since the wireless device 10 is connected to the access point 100, the wireless device 10 may transmit a DNS query which corresponds to the URL that is input using an address input window of a web page. Here, the DNS query denotes a packet that is transmitted to a DNS server (not illustrated) to inquire about an IP address of a web server that provides a service through the URL.

In this case, the controller 120 may acquire the PIN using the DNS query that is received from the wireless device 10.

Specifically, if the DNS query which corresponds to the URL that is input to the wireless device 10 is received from the wireless device 10, the controller 120 may detect the PIN from the received query.

In general, since the PIN is composed of a numeral of a certain number of figures, the controller 120 may detect the numeral of a certain number of figures included in the DNS query as the PIN. The certain number of figures may be predetermined. For example, the PIN may be composed of a numeral having four (4) figures or eight (8) figures. For example, the PIN may be "1234" or "12345678"

For example, if a user inputs "www.41211022.com" to the address input window of the web page that is displayed on the wireless device 10, the wireless device 10 may transmit a DNS query such as "QUERY NAME=www.41211022.com" to the access point 100.

In this case, the controller 120 may detect the numeral of eight (8) figures "41211022" in the DNS query "QUERY NAME=www.41211022.com", which exists between "www" that indicates a kind of a server and "com" that indicates the top-level domain, as the PIN.

As another example, if a user inputs "0022.net" to the address input window of the web page that is displayed on the wireless device 10, the wireless device 10 may transmit a DNS query such as "QUERY NAME=0022.net" to the access point 100.

In this case, the controller 120 may detect the numeral of 4 figures "0022" in the DNS query "QUERY NAME=0022.net", which exists in front of "net" that indicates the top-level domain, as the PIN.

As still another example, if a user inputs "http://26871354" to the address input window of the web page that is displayed on the wireless device 10, the wireless device 10 may transmit a DNS query such as "QUERY NAME=http://26871354" to the access point 100.

In this case, the controller 120 may detect the numeral of eight (8) figures "26871354" in the DNS query "QUERY NAME=http://26871354", which exists after "http://" that indicates a communication protocol, as the PIN.

On the other hand, if a user inputs only a numeral to the address input window of the web page that is displayed on the wireless device 10, the wireless device 10 may generate a DNS query for searching for the input numeral on a specific search site according to an application that provides a web service to transmit the generated DNS query to the access point 100. In such a case, the DNS query for the search is encrypted in a specific form according to a search site, and thus if the encryption method is not known, it becomes unable to detect the PIN from the corresponding DNS query.

Accordingly, in the case where a URL in the form of "communication protocol://server.numeral.top-level domain", "communication protocol://numeral.top-level domain", "communication protocol://numeral", "server.numeral.top-level domain", "server.numeral", or "numeral.top-level domain" is input to the wireless device 10 and the corresponding DNS query is received from the wireless device 10, the controller 120 may detect the PIN from the received DNS query.

Here, the communication protocol is a part of a URL that designates a language that is used to exchange data, and may include, for example, an HTTP protocol that permits transmission of a web page. Further, the server is a part of a URL that indicates a kind of the server, and may include, for example, www that indicates a web server. Further, the top-level domain is a part of a domain name that indicates a nation or an administrative organization, and includes, for example, com, co, kr, or net, etc.

As described above, if at least one of the communication protocol, the server, and the top-level domain in the URL form is input on the address input window of the web page that is displayed on the wireless device 10 together with the numeral, the controller 120 may detect the PIN from the DNS query that is received from the wireless device 10.

Further, the controller 120 may perform the connection between the access point 100 and the electronic device 200 through performing of the WPS using the PIN that is received from the electronic device 100 intended to be connected to the access point 100 and the PIN that is detected from the DNS query.

Specifically, the controller 120 determines whether the PIN that is acquired from the connection request signal of the electronic device 200 matches the PIN that is detected from the DNS query from the wireless device 10, and if they match each other, the controller 120 may control the communicator 110 to perform the WPS with the electronic device 200 to proceed with an authentication procedure. Accordingly, if the WPS is completed, the access point 100 and the electronic device 200 may be connected to each other to be in a communicable state.

On the other hand, if the PIN is detected from the DNS query that is received from the wireless device 10 in a state where the electronic device 200 intended to be connected to the access point 100 exists, the controller 120 may operate not to transmit the corresponding DNS query to the DNS server (not illustrated), but rather understands that the wireless device 10 is sending a PIN.

That is, the case where the PIN is detected from the DNS query that is received from the wireless device 10 in a state where the electronic device 200 intended to be connected to the access point 100 exists may mean that the intention of a user who has inputted the URL to the wireless device 10 is to transmit the PIN of the electronic device 200 intended to be connected to the access point 100 to the access point 100 through the wireless device 10.

Accordingly, if the PIN is detected from the DNS query that is received from the wireless device 10 in a state where the electronic device 200 intended to be connected to the access point 100 exists, the controller 120 may not transmit the corresponding DNS query to the DNS server (not illustrated).

In this case, the controller 120 may control the wireless device 10 to display a message indicating that the connection between the access point 100 and the electronic device 200 is completed.

That is, if the access point 100 completes the connection with the electronic device 200 using the PIN that is acquired from the wireless device 10, the controller 120 may control the communicator 110 to transmit data for displaying the message indicating that the connection between the access point 100 and the electronic device 200 is completed to the wireless device 10. Accordingly, the wireless device 10 may display a connection completion message using the data that is received from the access point 100.

For example, the controller 120 may display a connection completion message "Connection between TV and AP has been completed" on the wireless device 10 using information about the electronic device 200 that is acquired in the connection process.

Alternatively, the controller 120 may acquire the PIN from the wireless device 10 through other methods in addition to the above-described method.

For example, if the DNS query that corresponds to the URL that is input to the wireless device 10 is received in the wireless device 10 and the received DNS query satisfies a condition, the controller 120 may control the wireless device 10 to display a UI screen for receiving an input of the PIN. The condition may be predetermined.

Specifically, if a certain domain name exists in the DNS query that is received from the wireless device 10, the controller 120 may determine that the corresponding DNS query satisfies the certain condition, and may control the communicator 110 to transmit the data for displaying the UI screen for receiving an input of the PIN to the wireless device 10. The certain domain name may be predetermined.

Here, the domain name may be composed of the top-level domain and a second-level domain. The second-level domain is a part of the domain name that indicates the server name.

For example, if a user inputs "www.samsung-access.com" to the address input window of the web page that is displayed on the wireless device 10, the wireless device 10 may transmit a DNS query "QUERY NAME=www.samsung-access.com" to the access point 100.

In this case, since the domain name "samsung-access.com" exists in "QUERY NAME=www.41211022.com", the controller 120 may determine that the received DNS query satisfies the condition, and may operate to transmit the data for displaying the UI screen for receiving an input of the PIN to the wireless device 10.

Accordingly, the wireless device 10 may display the UI screen for receiving an input of the PIN using the data that is received from the access point 100. In this case, the UI screen may be in the form of a web page. Accordingly, if the PIN is input on the UI screen, the wireless device 10 may transmit the input PIN to the access point 100.

In this case, the controller 120 may perform the connection between the access point 100 and the electronic device 200 through performing of the WPS using the PIN that is received from the electronic device 200 intended to be connected to the access point and the PIN that is received from the wireless device 10 through the UI screen.

Specifically, the controller 120 determines whether the PIN that is acquired from the connection request signal of the electronic device 100 matches the PIN that is received from the wireless device 10 through the UI screen, and if the PINs match each other, the controller 120 may control the communicator 110 to perform the WPS with the electronic device 200 to proceed with an authentication procedure. Accordingly, if the WPS is completed, the access point 100 and the electronic device 200 may be connected to each other to be in a communicable state.

If the DNS query that is received from the wireless device 10 satisfies the condition in a state where the electronic device 200 intended to be connected to the access point 100 exists, the controller 120 may operate not to transmit the corresponding DNS query to the DNS server (not illustrated).

That is, the case where the certain domain name exists in the DNS query that is received from the wireless device 10 in a state where the electronic device 200 intended to be connected to the access point 100 exists may mean that the intention of a user who has inputted the URL to the wireless device 10 is to transmit the PIN to the access point 100 through UI screen.

Accordingly, if the DNS query that is received from the wireless device 10 satisfies the condition in a state where the electronic device 200 intended to be connected to the access point 100 exists, the controller 120 may not transmit the corresponding DNS query to the DNS server (not illustrated).

In this case, the controller 120 may control the wireless device 10 to display a message indicating that the connection between the access point 100 and the electronic device 200 is completed.

That is, if the access point 100 completes the connection with the electronic device 200 using the PIN that is acquired from the wireless device 10, the controller 120 may control the communicator 110 to transmit data for displaying the message indicating that the connection between the access point 100 and the electronic device 200 is completed to the wireless device 10. Accordingly, the wireless device 10 may display a connection completion message using the data that is received from the access point 100.

For example, the controller 120 may display a connection completion message "Connection between TV and AP has been completed" on the wireless device 10 using information about the electronic device 200 that is acquired in the connection process.

On the other hand, the controller 120 may determine whether the received DNS query satisfies the condition only in the case where the electronic device 200 intended to be connected to the access point 100 exists.

That is, in the case where the connection request signal that is broadcasted by the electronic device 200 is received through the communicator 110, the controller 120 may recognize the existence of the electronic device 200 intended to be connected to the access point 100. As described above, the controller 120 may determine whether the DNS query that is received from the wireless device 10 satisfies the condition only in the case where it is determined that a device which desires connection with the access point 100 exists in the neighborhood.

Further, in the case where the electronic device 200 intended to be connected to the access point 100 exists and the DNS query that is received from the wireless device 10 satisfies the predetermined condition, the controller 120 may not transmit the corresponding DNS query to the DNS server (not illustrated).

For example, in the case where "QUERY NAME=www.samsung-access.com" is received from the wireless device 20 in a state where a device which desires the connection with the access point 100 exists, the controller 120 may transmit the data for displaying the UI screen for receiving an input of the PIN to the wireless device 10, and may not transmit the corresponding query to the DNS server (not illustrated).

However, in the case where "QUERY NAME=www.samsung-access.com" is received from the wireless device 20 in a state where a device which desires the connection with the access point 100 does not exist, the controller 120 does not determine whether the certain domain name is included in the corresponding DNS query. In this case, the controller 120 may transmit the received DNS query to the DNS server (not illustrated), receive data from the web server (not illustrated) that provides a service through "www.samsung-access.com", and transmit the received data to the wireless device 10.

FIG. 6B is a block diagram explaining the detailed configuration of the access point according to an exemplary embodiment. As shown in FIG. 6B, the access point 100 may include a first communicator 110, a controller 120, a second communicator 130, and a storage 140.

Here, since the first communicator 110 and the controller 120 perform the same functions as the functions of the communicator 110 and the controller 120 as described above with reference to FIG. 6A, the detailed explanation thereof will be omitted.

The second communicator 130 is connected to the network 20. For example, the second communicator 130 may be connected to a router (not illustrated) by wire to connect to the access point 100 and to the network 20 through the router (not illustrated).

Accordingly, the controller 120 may transfer data that is provided from the network 20 to the wireless device 10 and the electronic device 200 through the first communicator 110, and may transfer data that is received from the wireless device 10 and the electronic device 200 to a corresponding destination of the network 20 through the second communicator 130.

The storage 140 stores therein various kinds of programs for an operation of the access point 100 and data.

For example, the storage 140 may store encryption/decryption methods predefined by manufacturers of the electronic device 200, information about a field into which a PIN is inserted, information about a PIN that is acquired from the electronic device 200, data of a connection completion message that is displayed on the wireless device 10, UI screen data for receiving an input of the PIN, and various kinds of data for connection between the access device 100 and the electronic device 200.

Accordingly, the controller 120 may perform the connection between the access device 100 and the electronic device 200 using the various kinds of data stored in the storage 140.

FIG. 7A is a block diagram explaining the configuration of the electronic device 200. As shown in FIG. 7A, the electronic device 200 includes a display 210, a communicator 220, and a controller 230.

The display 210 displays various screens. In particular, the display 210 may display authentication information for the connection between the access point 100 and the electronic device 200. Here, the authentication information may be a PIN and may be generated by the electronic device 200.

The communicator 220 may perform communication with an external device. Specifically, the communicator 220 may be provided with a communication module (not illustrated) according to a WiFi method, and may perform wireless communication with the access point 100.

The controller 230 controls the entire operation of the electronic device 200. For this, the controller 230 may include a microcomputer (or Central Processing Unit (CPU)), a Random Access Memory (RAM) and a Read Only Memory (ROM) for the operation of the electronic device 200. In this case, these modules may be implemented in the form of a System on Chip (SoC). The controller 230 may include a plurality of microprocessors, a plurality of CPUs or a plurality of microcomputers.

Specifically, if the electronic device 200 enters into a mode for a connection with an external device (hereinafter referred to as a "connection mode"), the controller 230 may control the communicator 220 to broadcast a connection request signal that includes authentication information for the connection with the access point 100.

Here, the connection request signal is a probe request signal, and may include information about a manufacturer and a model name of the electronic device 200 in addition to the authentication information. The authentication information is the PIN for performing the WPS between the access point 100 and the electronic device 200, and may be inserted into a field of a packet that constitutes the connection request signal according to the manufacturer of the electronic device 200. The field may be predetermined.

The controller 230 may randomly generate the PIN of the electronic device 200 that is composed of 4 or 8 figures to meet IEEE 802.11. However, this is merely exemplary, and for example the PIN may alternatively be allocated to the electronic device 200 and may be pre-stored.

Further, the controller 230 may control the display 210 to display the authentication information. For example, the controller 230 may display a screen "PIN of TV is 41211022."

Here, the reason why the electronic device 200 displays the authentication information, i.e., the PIN, is for a user to confirm the PIN of the electronic device 200 and to easily guide providing of the PIN to the access point 100 through the wireless device 10.

Accordingly, when displaying the PIN, the controller 230 may also display a message for the user to input the corresponding PIN to the wireless device 10. For example, the controller 230 may display a screen that includes a message "PIN of TV is 41211022. Please input the PIN on an address input window of a wireless device connected to AP."

Thereafter, the controller 230 may control the communicator 220 to perform the connection between the access point 100 and the electronic device 200 through performing of the WPS with the access point 100.

As described above, if the PIN that is acquired from the connection request signal of the electronic device 200 matches the PIN that is acquired from the wireless device 10, the access point 100 performs the WPS with the electronic device 200. On the other hand, if the PINs do not match, the access point 100 does not perform WPS with the electronic device 200. In this case, a notification may be provided to the electronic device 200 and/or the wireless device 10. Accordingly, if a request for performing the WPS is received from the access point 100, the controller 230 may control the communicator 220 to perform the authentication procedure through performing of the WPS with the access point 100. Accordingly, if the WPS is completed, the access point 100 and the electronic device 200 are connected to each other to be in a communicable state.

In this case, if the connection between the access point 100 and the electronic device 200 is completed, the controller 230 may control the display 210 to display a connection completion message.

For example, if the connection between the electronic device 200 and the access point 100 is completed, the controller 230 may display a message "Connection between TV and AP is completed." or "Connection with AP is completed." on the display 210.

FIG. 7B is a block diagram explaining a detailed configuration of a electronic device according to another exemplary embodiment. As shown in FIG. 7B, the electronic device 200 may further include a storage 240, a receiver 250, a signal processor 260, a remote control signal receiver 270, an inputter 280, and an audio outputter 290 in addition to a display 210, a communicator 220, and a controller 230. Here, since the display 210, the communicator 220, and the controller 230 perform the same functions as those as described above with reference to FIG. 7A, the detailed explanation thereof will be omitted.

The storage 240 may store therein various kinds of programs for an operation of the electronic device 200 and data. For example, the storage 240 may store information about the PIN of the electronic device 200 and various kinds of data for the connection between the access point 100 and the electronic device 200.

The receiver 250 may receive broadcasting content. The broadcasting content may include video, audio, and additional data (e.g., EPG), and the receiver 250 may receive broadcasting content from various sources, such as ground-wave broadcasts, cable broadcasts, satellite broadcasts, and Internet broadcasts.

For example, in order to receive broadcasting content transmitted from broadcasting stations, the receiver 250 may be configured to include a tuner (not illustrated), a demodulator (not illustrated), and an equalizer (not illustrated).

The signal processor 260 performs signal processing with respect to the content received through the receiver 250.

Specifically, the signal processor 260 may perform signal processing with respect to the video that constitutes the content in a form that can be output on a display (not illustrated) through performing of decoding, scaling, and frame rate conversion. Further, the signal processor 260 may perform signal processing with respect to the audio that constitutes the content in a form that can be output by the audio outputter 290 through performing of decoding and the like.

Accordingly, the controller 230 may display the video that constitutes the content on the display 210 and may output the audio that constitutes the content through the audio outputter 290.

The remote control signal receiver 270 receives a remote control signal that is input from a remote controller (not illustrated). For example, the remote control signal receiver 270 may receive remote control signals that correspond to various user commands for controlling the operation of the electronic device 200, and the controller 230 may perform functions that correspond to the received remote control signals.

The inputter 280 receives various user commands. The controller 230 may perform functions that correspond to the user commands input through the inputter 280. For this, the inputter 230 may be implemented by an input panel. The input panel may include a touch pad, a keypad including various kinds of function keys, numeral keys, special keys, and character keys, or a touch screen.

The audio outputter 290 is implemented by a speaker to output the audio.

Hereinafter, the operation of respective constituent elements of the access point 100 and the electronic device 200 in order to perform the connection in the method as described above with reference to FIG. 5 will be described with reference also to FIGS. 6A, 6B, 7A and 7B. However, the detailed explanation of the duplicate portions as described above with reference to FIG. 2 will be omitted.

FIG. 6A is a block diagram explaining the configuration of the access point 100. As shown in FIG. 6A, the access point 100 includes a communicator 110 and a controller 120.

First, if a connection request signal to be broadcasted by the electronic device 200 is received by the access point 100 through the communicator 110, the controller 120 may control the communicator 110 to transmit a connection response signal to the electronic device 200.

In this case, the connection request signal that is received from the electronic device 200 is a probe request signal, and may include information about the PIN of the electronic device 200.

Thereafter, the controller 120 may control the communicator 110 to transmit the PIN that is acquired from the wireless device 10 to the electronic device 200. Accordingly, if the PIN that is transmitted from the access point 100 matches the PIN that is generated by the electronic device 200, the electronic device 200 may perform the connection with the access point 100 through performing of the WPS with the access point 100.

Accordingly, if a request for performing the WPS is received from the electronic device 200, the controller 120 may control the communicator 110 to perform the authentication procedure through performing of the WPS. Accordingly, if the WPS is completed, the access point 100 and the electronic device 200 are connected to each other to be in a communicable state.

FIG. 6B is a block diagram explaining the detailed configuration of the access point according to another exemplary embodiment. As shown in FIG. 6B, the access point 100 may include a first communicator 110, a controller 120, a second communicator 130, and a storage 140.

Here, since the first communicator 110 and the controller 120 perform the same functions as the functions of the communicator 110 and the controller 120 as described above with reference to FIG. 6A, the detailed explanation thereof will be omitted.

The storage 140 stores therein various kinds of programs for the operation of the access point 100 and data.

For example, the storage 140 may store information about a PIN that is acquired from the wireless device 10 and various kinds of data for connection between the access device 100 and the electronic device 200. Accordingly, the controller 120 may perform the connection between the access device 100 and the electronic device 200 using the various kinds of data stored in the storage 140.

FIG. 7A is a block diagram explaining the configuration of the electronic device 200. As shown in FIG. 7A, the electronic device 200 includes a display 210, a communicator 220, and a controller 230.

First, if the electronic device 200 enters into a connection mode, the controller 120 may control the communicator 220 to broadcast a connection request signal. Here, the connection request signal is a probe request signal, and may not include information about the PIN of the electronic device 200.

Thereafter, if the PIN that is transmitted from the access point 100 is received through the communicator 220, the controller 230 may perform the connection between the access point 100 and the electronic device 200 through performing of the WPS using the PIN that is received from the access point 100 and the PIN that is generated by the electronic device 200.

Specifically, the controller 230 determines whether the PIN that is generated by the electronic device 200 matches the PIN that is received from the access point 100, and if they match each other, the controller 230 may control the communicator 220 to perform the authentication procedure through performing of the WPS with the access point 100. Accordingly, if the WPS is completed, the access point 100 and the electronic device 200 may be connected to each other to be in a communicable state.

In this case, if the connection between the access point 100 and the electronic device 200 is completed, the controller 230 may control the display 210 to display a connection completion message.

For example, if the connection between the electronic device 200 and the access point 100 is completed, the controller 230 may display a message "Connection between TV and AP is completed." or "Connection with AP is completed." on the display 210.

FIG. 7B is a block diagram explaining the detailed configuration of the electronic device according to another exemplary embodiment. As shown in FIG. 7B, the electronic device 200 may further include a storage 240, a receiver 250, a signal processor 260, a remote control signal receiver 270, an inputter 280, and an audio outputter 290 in addition to a display 210, a communicator 220, and a controller 230. Here, since the display 210, the communicator 220, and the controller 230 perform the same functions as those as described above with reference to FIG. 7A, the detailed explanation thereof will be omitted.

The storage 240 may store therein various kinds of programs for an operation of the electronic device 200 and data. For example, the storage 240 may store information about the PIN of the electronic device 200 and various kinds of data for the connection between the access point 100 and the electronic device 200.

Hereinafter, referring to FIGS. 8 to 11, a connection process between the access point 100 and the electronic device 200 will be described.

Figure 8:
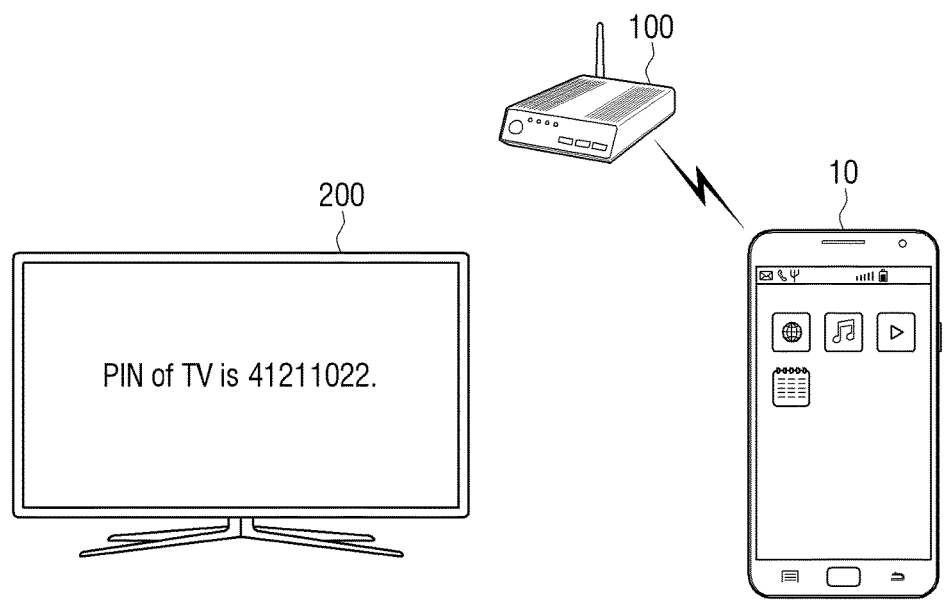
FIGS. 8 to 11 are diagrams illustrating a process of connecting between an access point and an electronic device according to an exemplary embodiment.

First, referring to FIG. 8, the wireless device 10 and the access point 100 have already been connected to each other, and the electronic device 200 is in a state to be connected to the access point 100.

If the electronic device 200 enters into a connection mode, the electronic device 200 may broadcast a connection request signal and may display its own PIN. For example, the electronic device 200 may display a screen that includes "PIN of TV is 41211022."

The access point 100 may acquire a PIN for connection between the access point 100 and the electronic device 200 based on the URL that is input to the wireless device 10.

Figure 9A:
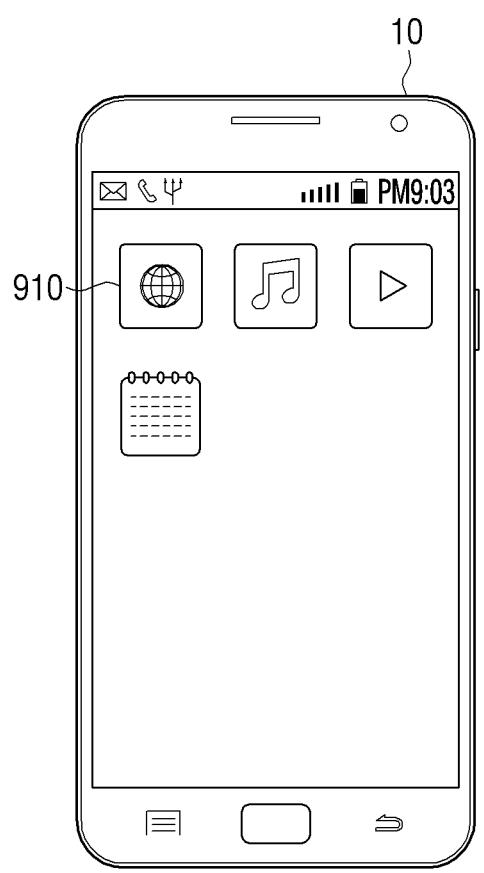
Figure 9B:
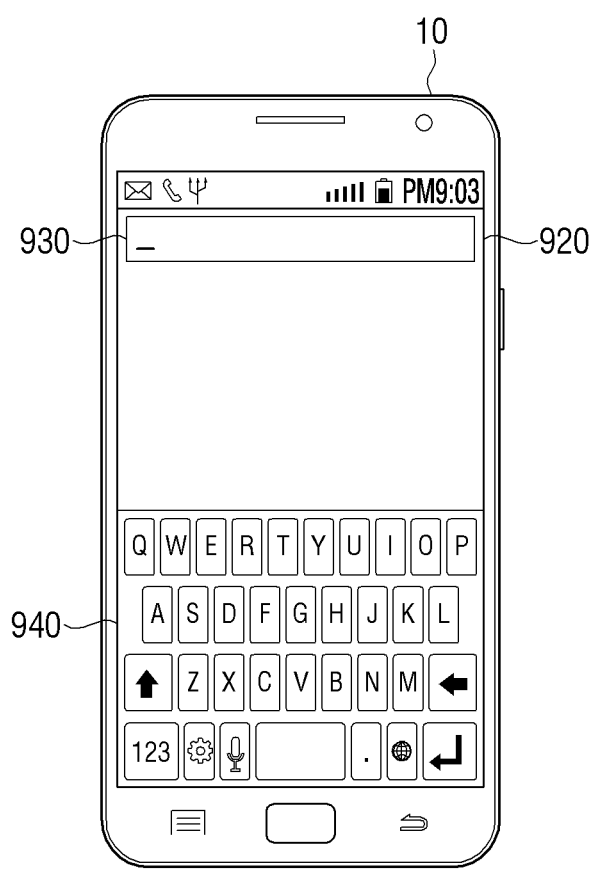
Figure 9C:
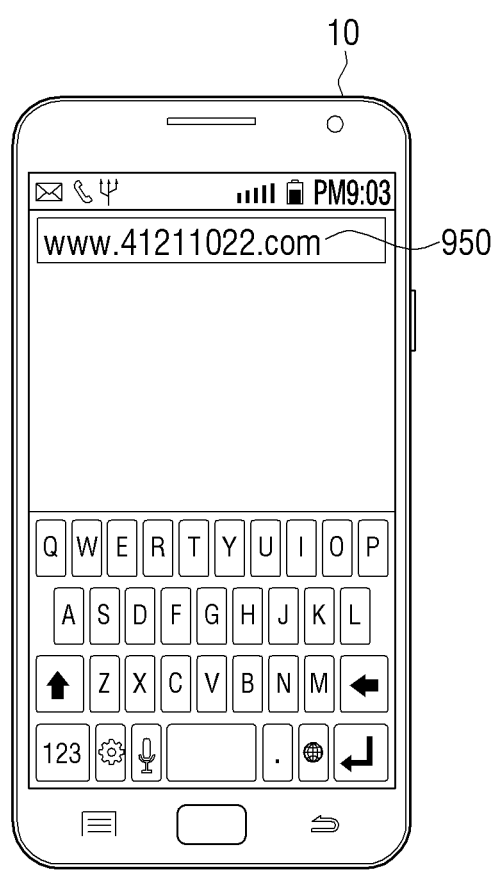

As an example, the access point 100 may acquire the PIN from the wireless device 10 in a method as illustrated in FIGS. 9A to 9C.

First, if an icon 910 for executing an Internet application is selected as shown in FIG. 9A, the wireless device 10 may display a web page 920 as shown in FIG. 9B. In this case, if an address input window 930 that is displayed on the web page 920 is selected, the wireless device 10 may display a virtual keyboard 940.

Thereafter, the wireless device 10 may display a URL 950 that is input by the user through the virtual keyboard as shown in FIG. 9C on the address input window, and may transmit a DNS query that corresponds to the input URL 950 to the access point 100.

In this case, since the DNS query that is transmitted to the access point 100 is "QUERY NAME=www.41211022.com", the access point 100 may detect "41211022" from the received DNS query as the PIN.

As another example, the access point 100 may acquire the PIN from the wireless device 10 in a method as illustrated in FIGS. 10A to 10E.

Figure 10A:
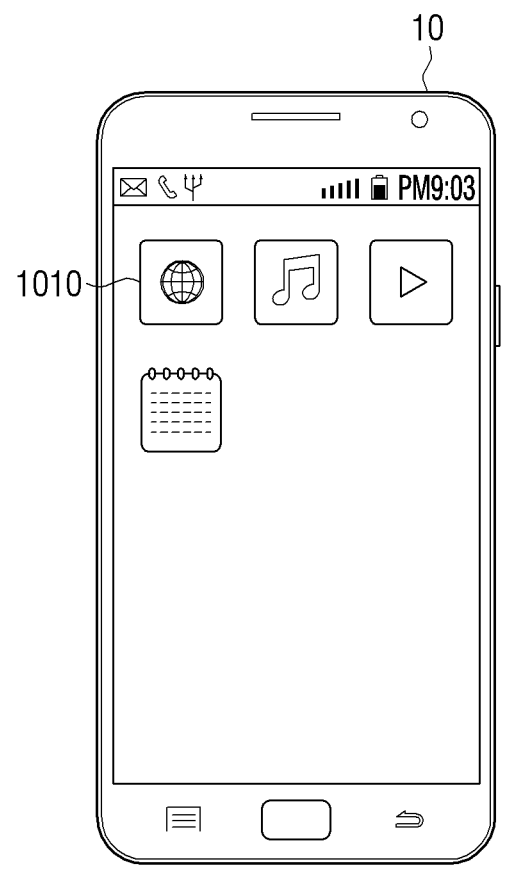
Figure 10B:
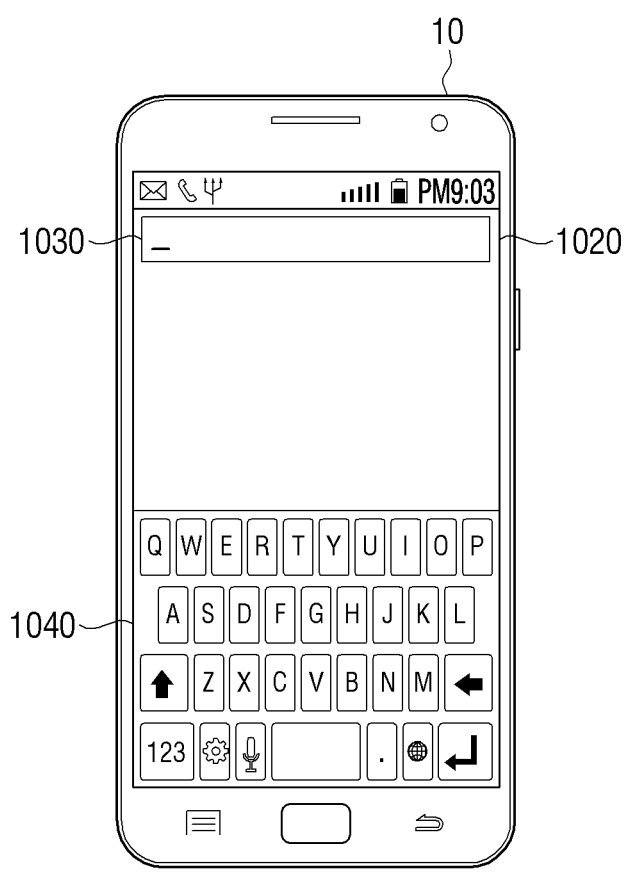

First, if an icon 1010 for executing an Internet application is selected as shown in FIG. 10A, the wireless device 10 may display a web page 1020 as shown in FIG. 10B. In this case, if an address input window 1030 that is displayed on the web page 1020 is selected, the wireless device 10 may display a virtual keyboard 1040.

Figure 10C:

Thereafter, the wireless device 10 may display a URL 1050 that is input by the user through the virtual keyboard as shown in FIG. 10C on the address input window, and may transmit a DNS query that corresponds to the input URL 1050 to the access point 100.

In this case, since the DNS query that is transmitted to the access point 100 is "QUERY NAME=www.samsung-access.com", the access point 100 may determine that a domain name "samsung-access.com" exists in the received DNS query, and may transmit data for displaying a UI screen for receiving an input of the PIN to the wireless device 10.

Figure 10D:
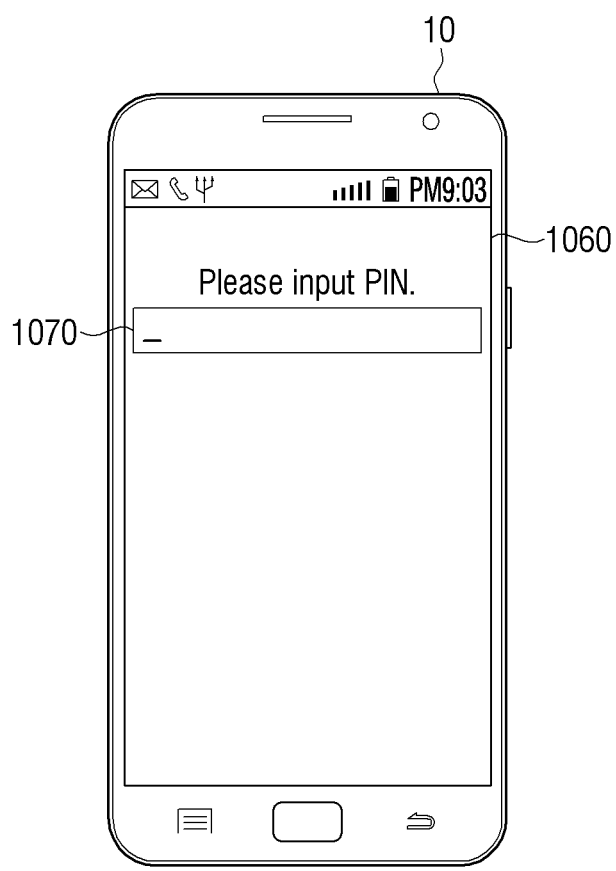

Accordingly, the wireless device 10 may display the UI screen 1060 for receiving an input of the PIN from the user as shown in FIG. 10D. In this case, the UI screen 1060 may include an input window 1070 for receiving an input of the PIN from the user.

Figure 10E:
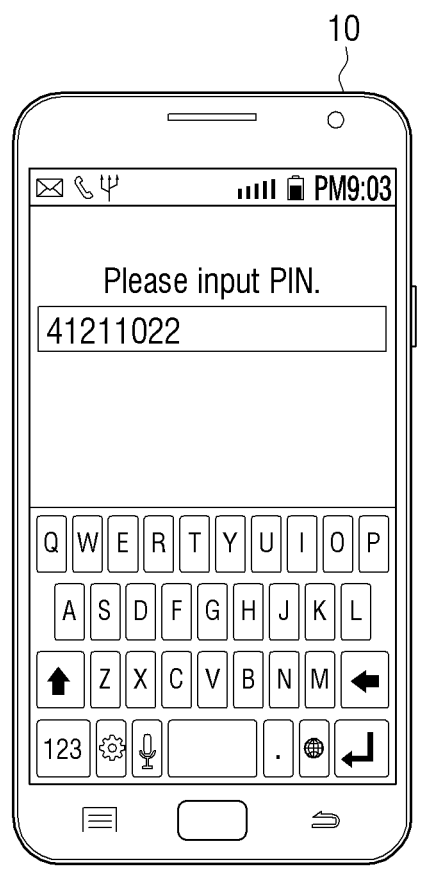

If the input window 1070 as shown in FIG. 10E is selected, the wireless device 10 may display a virtual keyboard, receive the PIN, and transmit the input PIN to the access point 100. Accordingly, the access point 100 may detect "41211022" as the PIN.

If the PIN is acquired from the wireless device 10, the access point 100 may determine whether the PIN that is acquired from the wireless device 10 matches the PIN that is acquired from the connection request signal of the electronic device 200, and if the PINs match, may operate to perform the connection between the access point 100 and the electronic device 200 through performing of the WPS with the electronic device 200.

Alternatively, or additionally, the access point 100 may transmit the PIN that is acquired from the wireless device 10 to the electronic device 200. In this case, the electronic device 200 may determine whether the PIN that is generated by itself matches the PIN that is received from the access point 100, and may operate to perform the connection between the access point 100 and the electronic device 200 through performing of the WPS with the access point 100.

If the access point 100 and the electronic device 200 are connected to each other, a message indicating that connection between the access point 100 and the electronic device 200 is completed may be displayed on at least one of the electronic device 200 and the wireless device 10.

Figure 11:
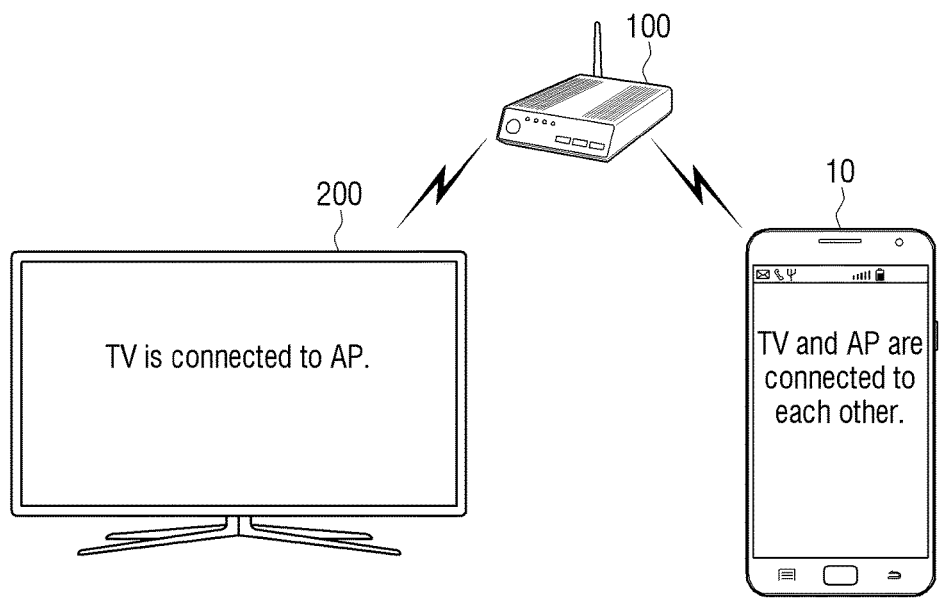

For example, as illustrated in FIG. 11, a message "TV is connected to AP" may be displayed on the electronic device 200, and/or a message "TV and AP are connected to each other" may be displayed on the wireless device 10.

FIG. 12 is a flowchart explaining a connection method of an access point according to an exemplary embodiment. Here, an access point and a wireless device are in a connection state.

First, if an electronic device intended to be connected to an access point exists, authentication information is acquired from the wireless device based on an URL that is input to the wireless device (S1210). Here, the authentication information may be a PIN for performing WPS between the access point and the electronic device.

Thereafter, connection with the electronic device is performed based on the acquired authentication information (S1220).

Alternatively, in S1210, if a DNS query that corresponds to the URL that is input to the wireless device is received from the wireless device, the PIN may be detected from the received DNS query.

In this case, in S1220, the connection between the access point and the electronic device may be performed through performing of WPS using the PIN that is received from the electronic device intended to be connected to the access point and the PIN that is detected from the received DNS query.

As another alternative, in S1210, if the DNS query that corresponds to the URL input to the wireless device is received from the wireless device and the received DNS query satisfies a condition, the wireless device is controlled to display a UI screen for receiving an input of the PIN. In this case, if a certain domain name exists in the received query, it may be determined that the received DNS query satisfies the condition.

In this case, in S1220, the connection between the access point and the electronic device may be performed through performing of the WPS using the PIN that is received from the electronic device intended to be connected to the access point and the PIN that is received from the wireless device through the UI screen.

A non-transitory computer readable medium in which a program for sequentially performing the connection method according to the exemplary embodiments is stored may be provided.

The non-transitory computer readable medium is not a medium that stores data for a short period, such as a register, a cache, or a memory, but means a medium which semi-permanently stores data and is readable by a device. Specifically, various applications and programs as described above may be stored and provided in the non-transitory computer readable medium, such as, a CD, a DVD, a hard disc, a Blu-ray disc, a USB, a memory card, and a ROM.

Further, although a bus is not illustrated in the block diagram illustrating the access point and the electronic device, communication between respective constituent elements of the access point and the electronic device may be performed through the bus. Further, a processor, such as a CPU or a microprocessor, which performs various functions as described above, may be further included in the access point and the electronic device.

While exemplary embodiments have been shown and described, it will be understood by those skilled in the art that various changes in form and detail may be made therein without departing from the spirit and scope of the inventive concept, as defined by the appended claims.

What is claimed is:

1. An access point comprising:
a communicator configured to communicate with a wireless device; and
a controller configured to control the communicator to acquire authentication information included in a Uniform Resource Locator (URL) that is received from the wireless device and to perform connection with an electronic device based on the acquired authentication information,
wherein the controller is configured to parse, in response to a Domain Name System (DNS) query comprising the URL being received from the wireless device, the authentication information from the received DNS query, and
wherein the URL is inputted through an address input window of the wireless device, and
wherein the authentication information is a Personal Identification Number (PIN) included in the URL.

2. The access point as claimed in claim 1, wherein the controller is configured to, in response receiving the DNS query, parse a Personal Identification Number (PIN) from the received DNS query for performing WiFi Protected Setup (WPS) between the access point and the electronic device.

3. The access point as claimed in claim 2, wherein the controller is configured to perform the connection between the access point and the electronic device by performing the WPS using a PIN that is received by the communicator from the electronic device and the PIN that is detected from the received DNS query.

4. An access point comprising:
a communicator configured to communicate with a wireless device; and
a controller configured to control the communicator to acquire authentication information included in a Uniform Resource Locator (URL) that is received from the wireless device and to perform connection with an electronic device based on the acquired authentication information,
wherein the controller is configured to control, if a Domain Name System (DNS) query comprising the URL received from the wireless device is a predetermined DNS query, the wireless device to provide a User Interface (UI) screen for inputting the authentication information, and
wherein the URL is inputted through an address input window of the wireless device, and
wherein the authentication information is a Personal Identification Number (PIN) included in the URL.

5. The access point as claimed in claim 4, wherein the controller is configured to, in response to the received DNS query including a certain domain name, control the wireless device to provide a User Interface (UI) screen for inputting the authentication information.

6. The access point as claimed in claim 4, wherein the controller is configured to, in response to the communicator receiving from the wireless device the PIN input to the UI screen receiving a PIN from the electronic device, perform the connection between the access point and the electronic device by performing a WPS using the PIN that is received from the electronic device and the PIN that is received from the wireless device through the UI screen.

7. A network system comprising an electronic device and an access point, wherein:
the electronic device is configured to broadcast a connection request signal that includes first authentication information for connection with the access point; and
the access point is configured to receive the connection request signal, and to perform connection with the electronic device based on the first authentication information and second authentication information which is received from a wireless device that is connected to the access point,
wherein the access point is configured to acquire the second authentication information included in a Uniform Resource Locator (URL) that is received from the wireless device,
wherein the access point is configured to parse, in response to a Domain Name System (DNS) query comprising the URL being received from the electronic device, the authentication information from the received DNS query, and
wherein the URL is inputted through an address input window of the wireless device, and
wherein the authentication information is a Personal Identification Number (PIN) included in the URL.

8. The network system as claimed in claim 7, wherein each of the first authentication information and the second authentication information is a Personal Identification Number (PIN) for performing WiFi Protected Setup (WPS) between the electronic device and the access point,
wherein the access point is configured to, in response receiving the DNS query, parse a PIN from the received DNS query as the second authentication information.

9. The network system as claimed in claim 7, wherein the electronic device is configured to display the authentication information.

10. A connection method of an access point, the connection method comprising:
acquiring authentication information included in a Uniform Resource Locator (URL) that is received from the wireless device if an electronic device to be connected to the access point exists;

parsing, in response to a Domain Name System (DNS) query comprising the URL being received from the wireless device, the authentication information from the received DNS query, and performing connection with the electronic device based on the acquired authentication information, and wherein the URL is inputted through an address input window of the wireless device, and wherein the authentication information is a Personal Identification Number (PIN) included in the URL.

11. The connection method as claimed in claim 10, the acquiring the authentication information comprises detecting the PIN from the received DNS query.

12. The connection method as claimed in claim 11, further comprising receiving a PIN from the electronic device, wherein the performing connection comprises performing the connection between the access point and the electronic device by performing the WPS using the PIN that is received from the electronic device and the PIN that is detected from the received DNS query.

13. The connection method as claimed in claim 10, acquiring the authentication information comprises, if the received DNS query satisfies a condition, sending a User Interface (UI) screen to the wireless device, the UI screen including a window for receiving an input of the PIN.

14. The connection method as claimed in claim 13, wherein if the received DNS query includes a certain domain name, the received DNS query satisfies the condition.

15. The connection method as claimed in claim 13, further comprising receiving the PIN input to the UI screen, from the wireless device, and receiving a PIN from the electronic device, wherein the performing connection comprises performing the connection between the access point and the electronic device by through performing a WPS using the PIN that is received from the electronic device and the PIN that is received from the wireless device through the UI screen.

* * * * *